Jan. 15, 1957 G. C. WELCH 2,777,207

DIAL INDICATOR

Filed Nov. 17, 1952

INVENTOR
GERALD C. WELCH

BY F. P. Keiper

ATTORNEY

United States Patent Office 2,777,207

Patented Jan. 15, 1957

1

2,777,207

DIAL INDICATOR

Gerald C. Welch, Rochester, N. Y.

Application November 17, 1952, Serial No. 321,002

7 Claims. (Cl. 33—172)

This invention relates to dial indicators, and more particularly to a universal mounting and support for such indicators.

The invention embodies an angle support having true surfaces at right angles, with a clamp so arranged as to avoid stressing and distortion of the angle support. The support is adapted to receive an articulated support arm having plural frictionally held swivel connections at right angles for universal setting, such arm being adapted to support a dial indicator as is disclosed in Patents No. 2,665,658 and No. 2,621,413 issued January 12, 1954, and December 16, 1952, respectively, or other commercially known dial indicators. The invention further embodies a support arm attachable to a dial indicator and transparent so as not to obscure the dial thereof.

The support and support arms are so adapted as to provide a mount for a dial indicator in substantially every conceivable relationship whereby testing may be effected respecting bores, cylindrical external surfaces, end shoulders, surfaces and other test operations. The various parts readily adapt themselves through utilization of various combinations and subcombinations thereof to surface test indicating, drill chuck and jig bore testing, height testing, and testing of lathe operations from the tool holder or lathe bed.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
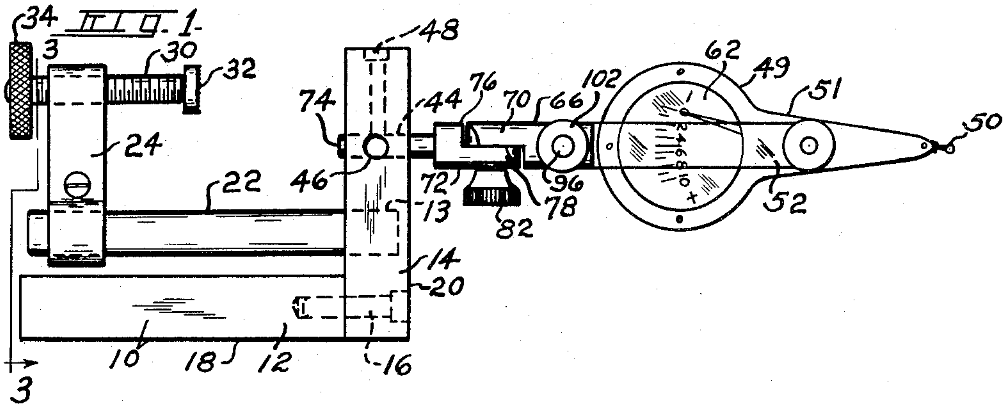
Figure 1 is a side elevation showing applicant's support and gage assembled for surface gage testing and performing other tests.
Figure 2:
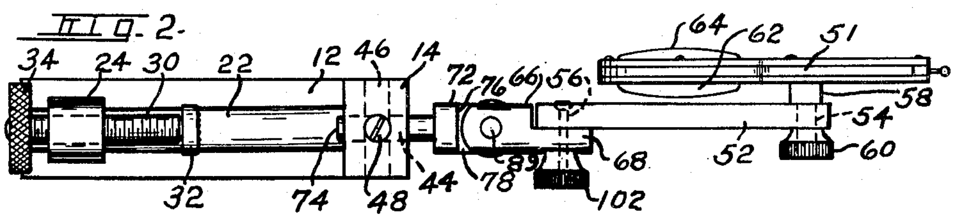
Figure 2 is a top plan view of the assembly of Figure 1.
Figure 3:
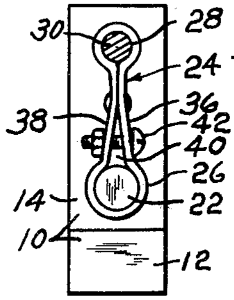
Figure 3 is a sectional view through the angle support clamp taken substantially on the line 3—3 of Figure 1.

Referring to Figures 1–3, inclusive, there is shown a

2 support angle member 10 comprising bars 12 and 14 suitably secured together at right angles by screws such as 16. The bars are of sufficient cross section to provide a rigid angle piece, and the surfaces 18 and 20, respectively, are ground true to planes at right angles to one another. Such angle member is provided with screw clamping means whereby the angle member may be affixed to various members, such as the bed of various machine tools, in a position near to a work piece to be subjected to test.

In order to avoid any strain due to clamping, tending to distort the angle member surfaces 18 and 20 out of their true right angle relationship, there is provided a separate post support for the clamp. Such post comprises a round bar 22, one end of which is driven into a bore or socket 13 in the member 14, the post extending alongside and normally parallel to the member 12. Adjustably mounted on the post 22 is a support arm 24 comprising strip material provided with a loop 26 at one end adapted to embrace the post 22, and a loop at the other end providing a threaded bore 28 through which extends the threaded clamp screw 30, such screw having a swivel grip pad 32 and knurled knob 34. The loop 26 merges into members 36 and 38 of the arm 24, which are spread apart as at 40 to form a split clamp, such members 36 and 38 being bridged by a clamp screw 42, whereby the loop 26 may be rigidly clamped to the post at any desired location along its length. Thus it will appear that any strain upon the post 22 will be ineffective to distort the angle between the members 12 and 14, regardless of the degree of tension applied through the tightening of the clamp screw 30.

The member 14 is provided with bores 44 and 46 extending perpendicular to one another, and on axes parallel with the plane of the surface 18 of member 12. A set screw 48 extending into the end of the member 14 extends to the intersection of the bores 44 and 46 and is adapted to clamp a rod extending through either bore rigidly in place.

A test indicator 49 is adapted to be supported with its test finger 50 in such relation as is desired to a particular work piece through a series of jointed members pivotally connected together in such manner as to afford the greatest amount of versatility. As shown, the articulated assembly comprises a transparent plastic bar member 52 having apertures 54 and 56 in its opposite ends, aperture 54 being adapted to receive the shouldered post 58 of the test indicator 49, such post being threaded and provided with a clamping thumb nut 60, whereby the indicator 49 may be rigidly secured to the transparent bar 52. By reason of the transparency of the bar, visibility of the dial 62 is maintained so that the opposite dial faces 62 and 64 are left equally visible to the operator, regardless of how the indicator may be mounted. At the same time, the support post 58 of the dial indicator may be located in a "balanced" location upon the frame 51 of the indicator, and at a point not too far distant from the indicating finger end. The bar member, if desired, may have a slightly convex top or bottom surface, or both, to provide a magnifying effect in viewing the graduations on the dial 62.

The bar is supported upon a short arm member 66, of generally circular cross section, such member being cut away to provide half round opposed ends 68 and 70 disposed at right angles to one another. The short arm member 66 in turn is supported from a shanked arm member 72, such member having a round shank 74 adapted to fit the apertures or bores 44 and 46 and an enlarged circular cross section head 76, cut away to produce a half round end 78 cooperating with the half round end 70 of the member 66. In practice, the shank may be made not longer than the length of the bore 46, and if desired, the length of the bore 44, it being necessary that the shank be long enough, when inserted in the bore 46, that it reach in far enough to be gripped by the set screw 48.

Figure 4:
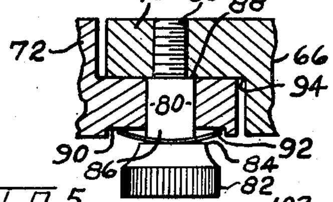
Figure 4 is an enlarged sectional view taken through a pivotal joint, as, for example, on the section line 4—4 of Figure 1.

The members 72 and 66 are joined together by threaded screw means such as shown in Figure 4. There shown is a thumb screw 80 having a knurled head 82 providing a shoulder 84, from which extends a cylindrical shank portion 86 terminating in a shoulder 88 from which extends a reduced diameter threaded tip 89. The half round end 78 of member 72 is provided with flat 90, and a dished resilient friction washer 92 is disposed upon the cylindrical shank portion 86 between the shoulder 84 and flat 90. The length of the shank portion 86 is so determined as to provide a correct degree of frictional pressure between the members 72 and 66 through the washer 92, when the thumb screw is threaded "home" in the end 70 of member 66, that is, with the shoulder 88 joined against the flat 94 of the half round end 70 of member 66.

Figure 5:
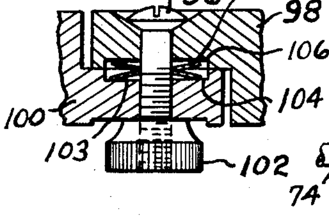
Figure 5 is an enlarged sectional view taken through a modified pivotal joint.

An alternative swivel friction joint may be employed as is shown in Figure 5, wherein a screw 96 extends through the member 98 and is threaded in the member 100, the screw being drawn sufficiently tight to provide the desired friction between members 98 and 100, after which the thumb nut 102 may be jammed against member 100 to lock the adjustment. In this arrangement, opposed dished resilient friction washers 103 may be disposed on the shank of the screw in shallow annular facing recesses 104 and 106 in the members 98 and 100.

Figure 6:
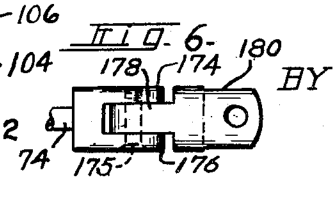
Figure 6 is an enlarged view of another modified pivotal joint.

A further alternative form is shown in Figure 6, wherein the member is forked to provide spaced members as at 174 and 176 to receive a tongue 178 of the member 180, such member likewise being forked to receive a bar such as 52. A pivot screw 175 is provided with a head at one end bearing adjacent the member 176, and threaded in the member 174. By regulating the tension on the screw, any desired friction is imposed upon the pivot joint so formed.

Any one of the pivotal joints of Figures 4, 5, and 6 may be used to join either the members 66 and 72 or the members 66 and 52, it being understood that where the form of Figure 4 is used in conjunction with a plastic bar 52, a suitable thread for plastic will be used, or the thumb nut placed on the plastic side, with the threaded end threaded into the end 68 of the member 66.

Figure 7:
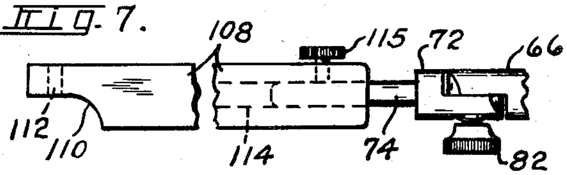
Figure 7 is a subassembly view of the support members affixed to a bar adapted to be received in a lathe tool holder.

In Figure 7, there is shown a rectangular section bar 108 adapted for use in a tool rest holder of a lathe or shaper. Such bar is cut away as at 110 and provided with a bore 112 which may be utilized to receive the post 58 of the test indicator 49, the bar being insertable in a tool rest holder. On the other hand, such bar is provided at its other end with a longitudinal bore 114, preferably of the same diameter as the bores 44 and 46, in order to receive the shank 74 of the member 72. A thumb set screw 115 is provided to secure the shank in position. Thus the articulated arm assembly may be supported from a tool holder rest or the angle member, as may be found convenient.

Figure 8:
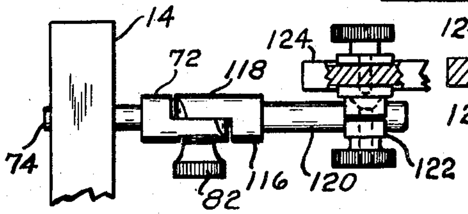
Figure 8 is a fragmentary view partly in section of a modified support adapted for supporting a dial indicator bar of a construction different from that shown in Figures 1 and 2.
Figure 9:
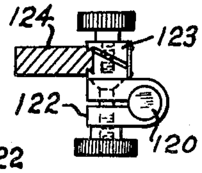
Figure 9 is an end elevational view of the modified support of Figure 8.

In order to render the angle member effective to support differing commercial indicators, the shank end member 72 may, as is shown in Figures 8 and 9, be coupled to a second member 116 having a half round end 118, and shank 120, which shank will preferably be of a different diameter to fit a clamping device such as 122, and to avoid confusion between such member 116 and member 72 by reason of the difference in shank diameter. The clamping device 122 is of the split knuckle variety and is adapted through a second split portion 123 thereof to receive a test indicator support bar 124 of a well-known commercial gage.

It will thus be apparent that by providing as a set an angle member 10 and the articulated assembly as shown in Figure 1, and the tool rest bar of Figure 7, and the enlarged shank member 116 of Figures 8 and 9, provision is afforded for supporting a dial indicator in any manner dictated by the work to be tested upon the machine tool bed or slide rest thereof where the work is undergoing processing. The angle member may be used as a clamp support, or if a surface indicator is desired, the flat surface 18 may be engaged with a true surface and the indicator adjusted so that its finger 50 is at a prescribed height thereabove. The articulated assembly may be held in a chuck, or in opposite relation to a turned member to determine axial alignment of a turned member in relation to the chuck spindle. The friction joints will permit quick adjustment, and yet hold such adjustment while tests are being performed. The many various uses will appear to those skilled in the art.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In combination, a dial indicator having a frame, an indicating dial at one end and a work contact member at the other, and a support stud intermediate the ends projecting from the frame in a direction substantially normal to the plane of the dial and in the direction that said dial faces, and a transparent support bar having one end secured to said support stud, said bar being of a length to extend beyond the dial end of said dial indicator, said bar having plane opposed faces adapted to lie in planes parallel to the plane of said dial whereby the indicating dial is visible through the bar.

2. In combination, a dial indicator having a frame, an indicating dial at one end and a work contact member at the other, and a support stud intermediate the ends projecting from the frame in a direction substantially normal to the plane of the dial and in the direction that said dial faces, and a transparent support bar having one end secured to said support stud, said bar being of a length to extend beyond the dial end of said dial indicator, said bar having plane opposed faces adapted to lie in planes parallel to the plane of said dial whereby the indicating dial is visible through the bar, and articulated means for supporting said bar at its other end.

3. In combination, a dial indicator having a frame, an indicating dial at one end and a work contact member at the other, and a support stud intermediate the ends projecting from the frame in a direction substantially normal to the plane of the dial and in the direction that said dial faces, and a transparent support bar having one end secured to said support stud, said bar being of a length to extend beyond the dial end of said dial indicator, said bar having plane opposed faces adapted to lie in planes parallel to the plane of said dial whereby the indicating dial is visible through the bar, and articulated means for supporting said bar at its other end, said articulated means comprising first and second members having overlapping ends, and a pivotal friction connection therebetween lying on an axis transverse to the longitudinal axes of both members, and a pivotal connection between the other end of the second member and said bar, said pivotal connection lying on an axis transverse to the longitudinal axes of the second member and bar, said pivotal connection axes lying in planes extending through the longitudinal axis of the second-named member and at right angles to one another.

4. In combination, a dial indicator having a frame, an indicating dial at one end and a work contact member at the other, and a support stud intermediate the ends projecting from the frame in a direction substantially normal to the plane of the dial and in the direction that said dial faces, and a transparent support bar having one end secured to said support stud, said bar being of a length to extend beyond the dial end of said dial indicator, said bar having plane opposed faces adapted to lie in planes parallel to the plane of said dial whereby the indicating dial is visible through the bar, and articulated means for supporting said bar at its other end, said articulated means comprising first and second members having overlapping ends, and a pivotal friction connection therebetween lying on an axis transverse to the longitudinal axes of both members, and a pivotal connection between the other end of the second member and said bar, said pivotal connection lying on an axis transverse to the longitudinal axes of the second member and bar, said pivotal connection axes lying in planes extending through the longitudinal axis of the second-named member and at right angles to one another, and a cylindrical shank extending from the other end of the first member along the longitudinal axis of the first member.

5. In a support for a dial indicator, an angle piece having rigid leg portions at right angles, each of said leg portions having a true planar outer surface, one being perpendicular to the other, a post mounted in one leg portion extending alongside the other leg portion, an arm mounted on said post overhanging the free end of said one leg portion, a clamp screw threaded in said arm and having a clamp pad adapted to be adjusted toward and away from said one leg, a bore in said one leg normal to the planar surface thereof, and an articulated support arm for supporting a dial indicator comprising a first member having a shank at one end positioned in said bore and a second member frictionally pivoted to the other end of the first member.

6. In a support for a dial indicator, an angle piece having rigid leg portions at right angles, each of said leg portions having a true planar outer surface, one being perpendicular to the other, a post mounted in one leg portion extending alongside the other leg portion, an arm mounted on said post overhanging the free end of said one leg portion, a clamp screw threaded in said arm and having a clamp pad adapted to be adjusted toward and away from said one leg, a bore in said one leg normal to the planar surface thereof, and an articulated support arm for supporting a dial indicator comprising a first member having a shank at one end positioned in said bore and a second member frictionally pivoted at one end to the other end of the first member, and a transparent rectangular sectioned bar having one end pivoted to the other end of said second member.

7. In a support for a dial indicator, an angle piece having rigid leg portions at right angles, each of said leg portions having a true planar outer surface, one being at right angles perpendicular to the other, a post mounted in one leg portion extending alongside the other leg portion, an arm mounted on said post overhanging the free end of said one leg portion, a clamp screw threaded in said arm and having a clamp pad adapted to be adjusted toward and away from said one leg, a bore in said one leg normal to the planar surface thereof, and an articulated support arm for supporting a dial indicator comprising a first member having a shank at one end positioned in said bore and a second member frictionally pivoted at one end to the other of the first member, said members at their pivoted ends being cut away to form complemental overlapping portions with plane engaging surfaces lying parallel to the longitudinal axes of said members, and a threaded pivot member passing through said overlapping portions normal to said surfaces, and adapted to hold said surfaces in frictional engagement.

References Cited in the file of this patent

UNITED STATES PATENTS

| | | |
|---|---|---|
| 276,791 | Engle | May 1, 1883 |
| 889,853 | Levy | June 2, 1906 |
| 1,059,948 | Neberle | Apr. 22, 1913 |
| 2,267,583 | Carroll | Dec. 23, 1941 |